United States Patent
Alago

[15] 3,659,766
[45] May 2, 1972

[54] MATTRESS PANEL CUTTER

[72] Inventor: Edward Alago, 1347 Hancock Street, Brooklyn, N.Y. 11227

[22] Filed: Dec. 8, 1970

[21] Appl. No.: 96,021

[52] U.S. Cl. ................................. 225/94, 225/96, 225/100
[51] Int. Cl. ..................................... B26d 9/00, B65h 35/10
[58] Field of Search ............................. 225/96, 100, 2, 4, 94

[56] References Cited

UNITED STATES PATENTS

| | | | |
|---|---|---|---|
| 2,246,228 | 6/1941 | Winter | 225/100 |
| 2,380,949 | 8/1945 | Davidson | 225/100 |
| 2,778,424 | 1/1957 | Hageman et al. | 225/100 X |

*Primary Examiner*—Frank T. Yost
*Attorney*—Charles Marks

[57] ABSTRACT

A spool of fabric is fed through a series of rollers where it is exposed to cutters which trim it to a predetermined width, shear cusp-shaped indentations at regular intervals on opposing edges of the fabric and form perforations between the apices of the cusp-shaped indentations. After the perforations are formed, the fabric is burst in the vicinity thereof, thereby forming a mattress panel which is then disposed upon a second spool. During the foregoing operations, the fabric is maintained in an unwrinkled position by means of angular grooves formed upon gripping rollers in contact with the fabric.

3 Claims, 7 Drawing Figures

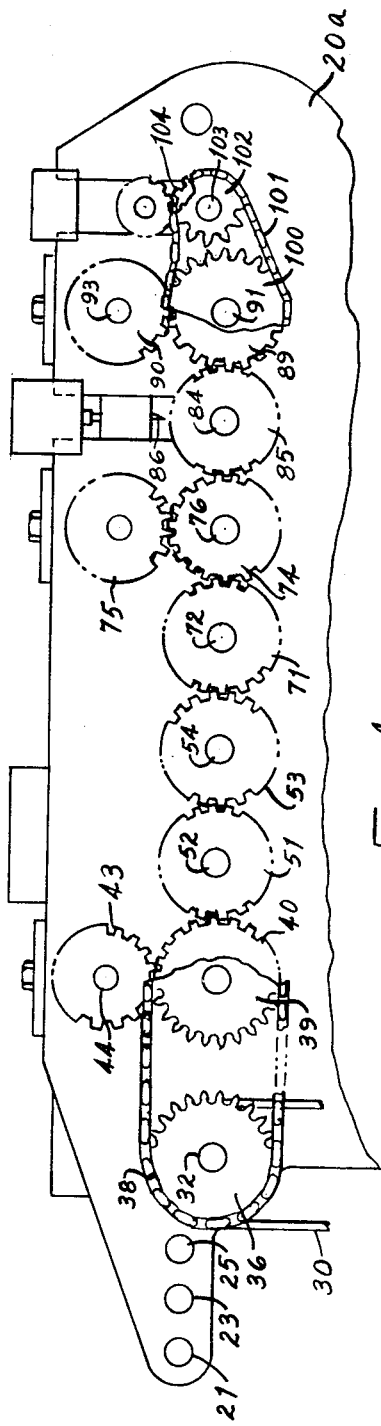
Fig. 4
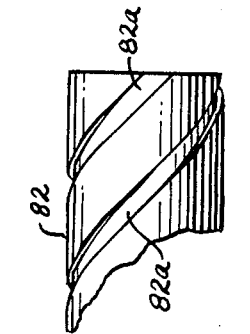
Fig. 7
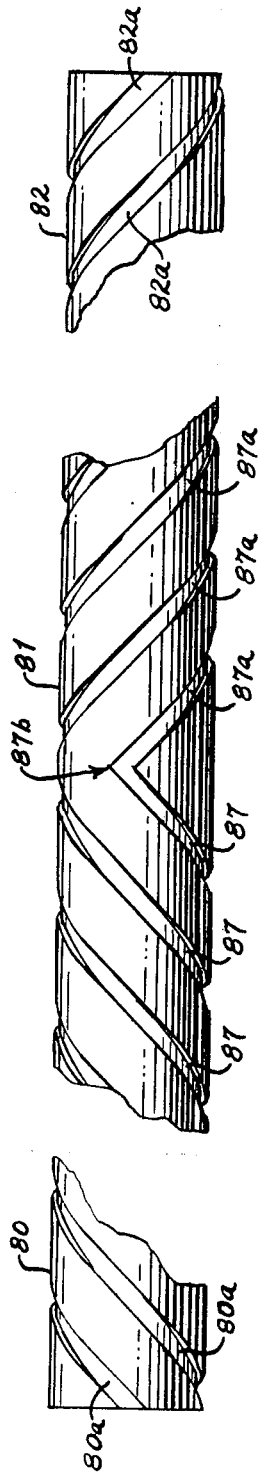
Fig. 5
Fig. 6

MATTRESS PANEL CUTTER

BACKGROUND OF THE INVENTION

1. Field of the Invention

This invention relates generally to fabric cutting machines and is particularly concerned with an improved machine for cutting mattress panels.

2. Description of the Prior Art

A mattress panel consists of a sheet of fabric having a generally rectangular conformation, the corners of which are curved, thereby being adapted to incorporation in a mattress as an upper or lower face thereof. Heretofore, mattress panels have been formed by a variey of intricate and expensive machines which customarily perform portions of the required cutting operations but not all of them in any one machine. One of the difficulties encountered in this regard arises from the fact that where a sequence of such cutting operations is to be performed in a machine utilizing numerous rollers for positioning and conveying the fabric, it tends to wrinkle or be otherwise difficult to maintain in positions in which the cutting operations can be accurately and properly performed.

Moreover, may of the cutting machines conventionally employed are not adjustable to form portions of mattress panels of more than one predetermined dimension and make such dimension dependent upon the speed of operation of the machine, thereby limiting the range of sizes of mattress panels which are available therefrom.

The present invention solves these problems.

SUMMARY OF THE INVENTION

In the present invention, a roll of fabric is fed through a series of rollers wherein it is consecutively trimmed to a predetermined width by suitable shearing means, provided with cusp-shaped indentations at predetermined intervals and then perforated between the apices of the cusp-shaped indentations, the fabric thereafter being burst in the vicinity of the perforations so as to complete the formation of the desired mattress panels. The latter are then accumulated upon a suitable roll from which they are removable as desired.

All of the foregoing steps are performed in sequence upon on machine thereby providing a unitary means for forming mattress panels. Throughout the various operations, the fabric is prevented from wrinkling by means of angularly disposed grooves formed upon the peripheries of cylinders which maintain the fabric in contact with the rollers and exert a gripping action so as to stretch the fabric and permit it to be fed evenly and accurately into positions whereby said operations can be accomplished.

Thus, it is an object of the present invention to provide unitary means for performing all of the steps required to manufacture mattress panels.

Another object of the invention is to provide a device of the foregoing character which is capable of forming mattress panels of any desired length.

Another object of the invention is to provide a device of the foregoing character which is adapted to manufacture mattress panels at varying rates of production as desired.

Another object of the invention is to provide means for adequately feeding a continuous sheet of fabric through a device of the foregoing character.

Another object of the invention is to provide a device of the foregoing character which is automatic in operation, requires no specialized training on the part of operators thereof and is of simple, sturdy and economical design.

Other and further objects of the present invention will become apparent from the following discussion when read in conjunction with the accompanying drawings.

BRIEF DESCRIPTION OF THE DRAWINGS

In the drawings:

FIG. 4 is a fragmentary, elevational view taken about the line 4—4 of FIG. 2 and illustrating the gear train employed in said embodiment of the invention;

FIG. 5 is a fragmentary, elevational view taken about the line 5—5 of FIG. 2;

FIG. 6 is a fragmentary, elevational view taken about the line 6—6 of FIG. 2;

FIG. 7 is a fragmentary, elevational view taken about the line 7—7 of FIG. 2.

Throughout the several views, similar numerals are employed to refer to similar parts of the invention.

DESCRIPTION OF THE PREFERRED EMBODIMENT

Figure 1:
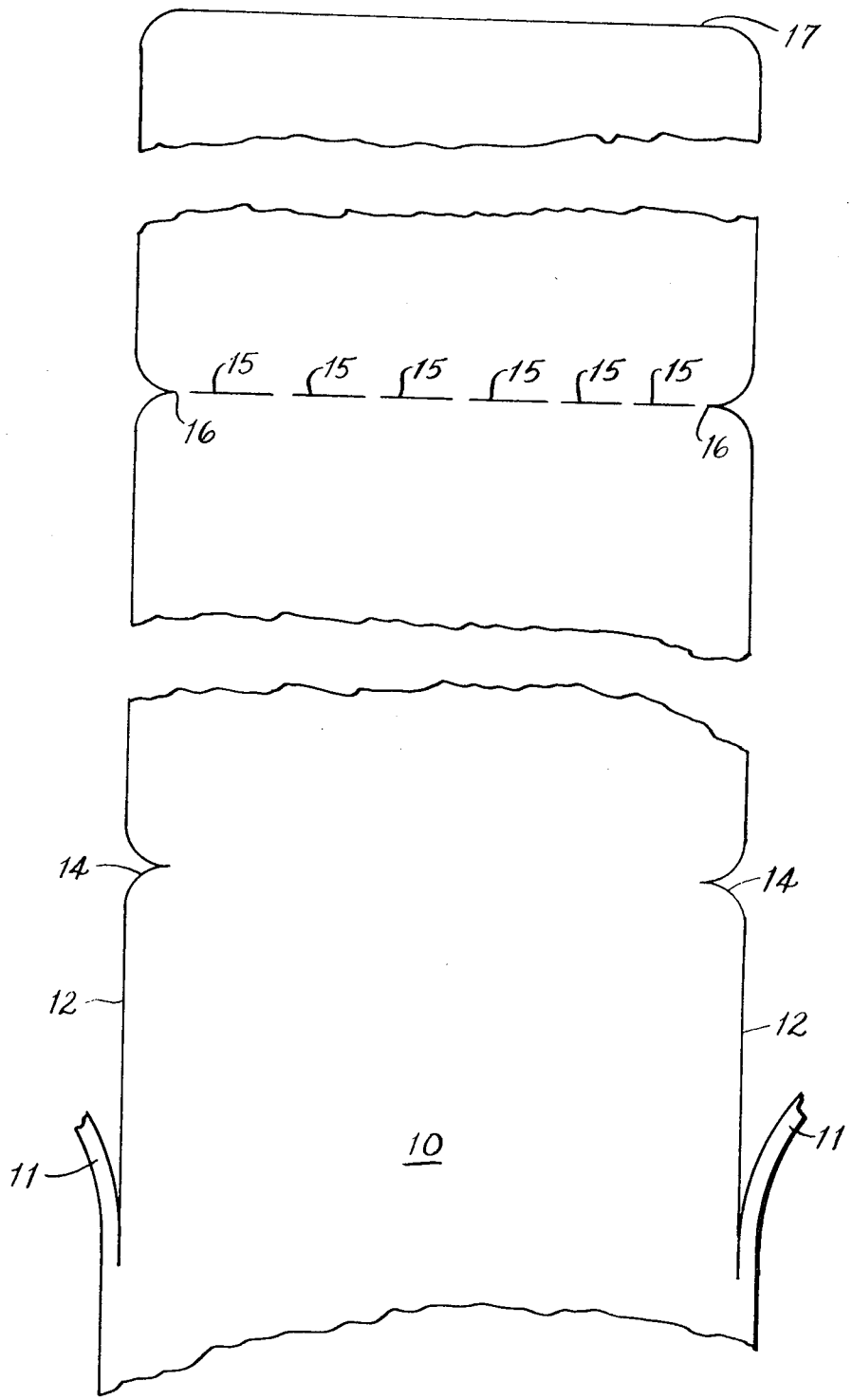
FIG. 1 is a fragmentary plan view depicting a sheet of fabric in various stages of manufacture into mattress panels by means of the present invention.
Figure 2:
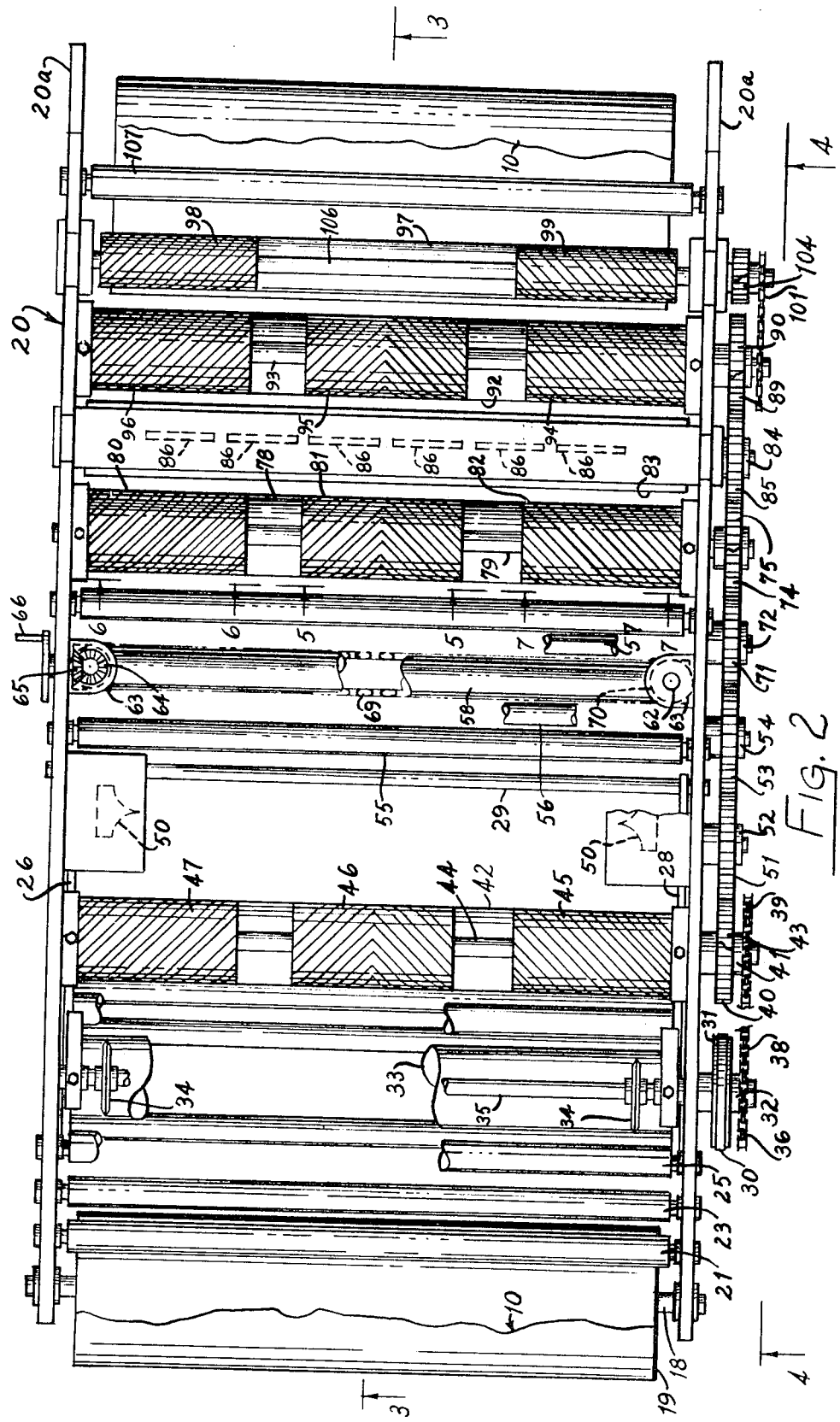
FIG. 2 is a plan view of one embodiment of the present invention.
Figure 3:
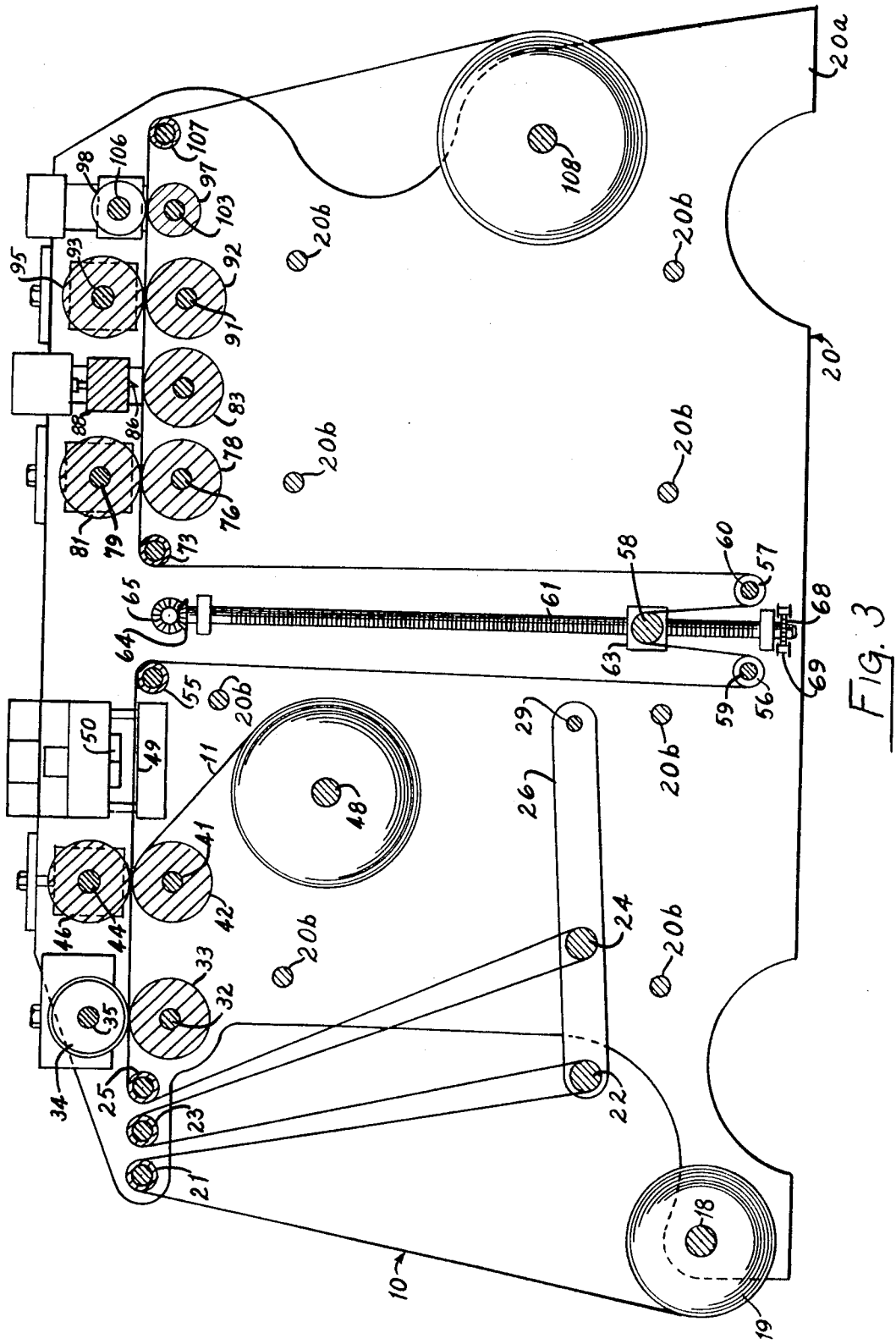
FIG. 3 is a cross-sectional view taken about the line 3—3 of FIG. 2.

The present invention forms a series of mattress panels of predetermined dimensions by means of a unitary device which incorporates all of the required manufacturing operations. As shown in FIG. 1 of the accompanying drawings, the said manufacturing operations are performed in sequence upon a sheet of suitable fabric, generally designated by the numeral 10, which is successively trimmed to a predetermined width by removing the edges 11. The edges 12 of the fabric 10 are then formed with curved, cusp-shaped indentations 14 and thereafter the fabric 10 is perforated, as at 15, in the vicinity of the apices 16 of the cusp-shaped indentations 14, and then "burst" apart along said perforated portion, thereby forming a smooth end portion 17. By repeated these operations, a series of mattress panels may be manufactured in any desired quantity, their rate of manufacture being limited only by the rapidity of performance of the foregoing operations The performance of these operations by means of the present invention may be better understood from a consideration of the device depicted in FIGS. 2–7 of the drawings. As shown in FIGS. 2 and 3, a spool 18 carrying a roll 19 of the fabric 10 is journalled in the side walls 20a of a frame, generally designated by the numeral 20 and provided with suitable cross-braces 20b. The fabric 10 is led over a series of tensioning rollers 21, 22, 23, 24 and 25, the rollers 21, 23 and 25 being journaled in said side walls 20a; and the rollers 22 and 24 being journaled in a pair of arms 26, 28 pivotably supported upon a shaft 29 which is also journaled in the side walls 20a. The weight of the rollers 22, 24 and arms 26, 28 maintains the tension of the fabric 10.

As shown in FIGS. 2 and 4, a belt 30 driven by a suitable driving means (not shown) is mounted upon a pulley 31 which surmounts a shaft 32 provided upon a roller 33. Vertically adjustable, circular cutters 34 are mounted upon a shaft 35 supported in the side walls 20a of the frame 20, the circular cutters 34 also being inwardly and outwardly adjustable on the shaft 35 so as to be separable at any predetermined distance on the shaft 35.

The fabric 10 is led between the roller 33 and the cutters 34 which are contactable with the fabric 10 so as to shear or trim away the edges 11 thereby forming the fabric 10 to a predetermined width, the same being the desired width of the mattress panel to be manufactured by this device.

The shaft 32 is also provided with a sprocket 36 and chain 38 which drives a similar sprocket 39 and gear 40 mounted upon a shaft 41 journalled in the side walls 20a. The shaft 41 is also provided upon a roller 42.

Gear 40 is engaged with a gear 43 disposed on a vertically adjustable shaft 44 supported in the side walls 20a of the frame 20 and provided upon a plurality of rollers 45, 46 and 47.

The fabric 10, as well as the trimmed edges 11, are fed between and gripped by the roller 42 and the rollers 45, 46 and 47, said edges 11 then being led to and accumulated upon a suitable spool 48 journaled in the side walls 20a of the frame 20, whence the edges 11 may be removed, as desired.

The fabric 10 is also led between platens 49 and vertically reciprocable cutting dies 50, which are adapted to cut the cusp-shaped indentations 14 on the edges 12 of the fabric 10. The cutting dies 50 may be vertically reciprocated as often as desired so that the cusp-shaped indentations 14 may be formed at any desired longitudinal interval along the edges 12 of the fabric 10, said longitudinal interval being determined by the speed of the fabric 10 between the platens 49 and cutting dies 50 and the frequency of reciprocation of said dies 50, both said speed and said frequency being adjustable by well known means.

Gear 40 is engaged with an idler gear 51 surmounting shaft 52 journaled in the side walls 20a of frame 20, said gear 51 being engaged with gear 53 surmounting shaft 54 journaled in the side walls 20a of frame 20. The fabric 10 is led upon roller 55, journaled in side walls 20a, and tensioning rollers 56, 57 and 58. Rollers 56 and 57 are provided with shafts 59, 60 journalled in the side walls 20a of frame 20. Between said rollers 56 and 57, vertical screws 61, 62 depend from the side walls 20a of the frame 20 and are threadedly engaged with blocks 63 wherein the roller 58 is journaled. At the upper end of vertical screw 61, a bevel gear 64 is provided and is engaged with a bevel gear 65 journaled in a side wall 20a of frame 20 and rotatable by means of crank 66 so as to dispose roller 58 at any desired height with respect to rollers 56 and 57, thereby determining the tension of the fabric 10 in the vicinity of said rollers 56, 57 and 58.

A sprocket 68 is mounted upon the lower end of vertical screw 61 and is provided with a chain 69 engaged with a similar sprocket 70 mounted upon the lower end of vertical screw 62 and rotating said vertical screw 62 in unison with the rotation of vertical screw 61, thereby maintaining the roller 58 in a horizontal position at all times, regardless of its vertical disposition by means of crank 66.

Gear 53 is engaged with gear 71 mounted upon shaft 72 journaled in the side walls 20a of frame 20. Roller 73, journaled in side walls 20a, receives the fabric 10 from roller 57. Gear 71 is engaged with gear 74 which, in turn, is engaged with gear 75.

Gear 74 is mounted upon shaft 76 journalled in the side walls 20a of frame 20 and provided upon roller 78. Gear 75 is mounted upon vertically adjustable shaft 79 provided with a plurality of gripping rollers 80, 81, 82. The fabric 10 is led between roller 78 and said gripping rollers 80, 81, 82 and then to roller 83 which is mounted upon a shaft 84 journaled in the side walls 20a of frame 20 and surmounted by a gear 85 engaged with gear 74.

When the fabric 10 is disposed upon roller 83, said fabric 10 is exposed to vertically reciprocable perforating blades 86 disposed in a transverse head 88 slidably mounted in the side walls 20a of the frame 20. The frequency of reciprocation of the perforating blades 86 is adjusted so that they form perforations 15 aligned with the apices 16 of the cusp-shaped indentations 14.

Gear 85 is engaged with gear 89 which, in turn, is engaged with gear 90. Gear 89 is mounted upon a shaft 91 journaled in the side walls 20a of the frame 20 and provided with gripping rollers 94, 95, 96.

After perforation by the perforating blades 86, the fabric 10 is led between roller 92 and gripping rollers 94, 95, 96 and thence between roller 97 and gripping rollers 98, 99. Shaft 91 is provided with a sprocket 100 and chain 101 which is also engaged with a sprocket 102 mounted upon a shaft 103 journaled in the side walls 20a of the frame 20, said shaft 103 being provided upon the roller 97.

Shaft 103 is also surmounted by a gear 104 engageable with gear 105 surmounting vertically reciprocable shaft 106 which is slidably supported by the side walls 20a of the frame 20 so as to permit retraction of gear 105 from engagement with gear 104. Shaft 106 is also provided with gripping rollers 98, 99.

It will be observed that when gear 105 is brought into engagement with gear 104, there is a momentary change in the speed of the rollers 97, 98, 99, and the fabric 10 which is gripped between rollers 92, 94, 95, 96 and rollers 97, 98, 99, is stressed, thereby bursting it in the vicinity of the perforations 15, the aforesaid engagement of the gears 104, 105 being adjusted to occur when said perforations 15 are disposed between rollers 92 and 97.

The frequency with which shaft 106 reciprocates is adjusted to accomplish successive burstings of the fabric 10 in the foregoing manner, thereby completing the manufacture of successive mattress panels, which are then rolled over guide roller 107 and upon a spool 108 journaled in the side walls 20a of the frame 20, the spool 108 being removable, as desired, so as to permit subsequent storage or use of the mattress panels thereon.

In performing the foregoing operations, it has been found important to avoid wrinkling the fabric 10. With this end in view, the gripping rollers 45, 46, 47, 80, 81, 82, 94, 95, 96, 98, 99 are provided with means for urging the fabric 10 outwardly of the longitudinal axis of the foregoing machine. Thus, as depicted in FIG. 5, gripping roller 81 is provided with a plurality of helical grooves 87, 87a formed upon the circumferential periphery of said gripping roller 81 and angularly inclined outwardly from the center of said gripping roller 81, said helical grooves 87, 87a meeting in a V-shaped junction as at 87b. Gripping rollers 46 and 95 are provided with grooves similar to those of gripping roller 81.

As shown in FIGS. 6 and 7, gripping rollers 80, 82 are also provided with one or more helical grooves 80a, 82a formed on the circumferential periphery of said gripping rollers 80, 82 and inclined outwardly with respect to the longitudinal axis of the foregoing machine. Unlike gripping roller 81, the grooves formed on gripping roller 80 are parallel to each other; and the grooves formed on gripping roller 82 are also parallel to each other. Gripping rollers 47, 96 and 98 are provided with grooves similar to those of gripping roller 80; and gripping rollers 45, 94 and 99 are provided with grooves similar to those of gripping roller 82.

With the foregoing arrangement, the fabric 10 tends to be pressed into the grooves 80a, 82a, 87, 87a when the rollers upon which they are formed make contact with the fabric 10, thereby urging the fabric 10 outwardly of the longitudinal axis of the frame 20 and avoiding wrinkling of said fabric 10 as it is being fed through the above described operations, and permitting them to be performed at a high rate of speed.

It will also be observed that the speed of said operations and hence, the rate of production of the mattress panels manufactured thereby, are limited only by the speed of rotation of the pulley 31 which operates the various sprockets and gears hereinabove mentioned. Moreover, since the trimming, cusp-shaped indentation forming, perforation and bursting operations may be adjusted to occur at any desired location on the fabric 10, regardless of the speed with which it is fed through the machine, mattress panels of a great range of dimensions may be formed. In addition, since the operations are completely automatic, no skilled labor is required to operate the machine or supervise the manufacture of mattress panels thereon.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In a mattress panel cutter, the combination comprising:
   a. a frame;
   b. a spool journaled in the the frames and provided with a roll of fabric;
   c. adjustable means depending from said frame for trimming said fabric to a predetermined width;
   d. spool means journaled in said frame for receiving trimmed edges of said fabric;

e. reciprocable means depending from said frame for successively cutting cusp-shaped indentations in opposing edges of the fabric after it is trimmed by said trimming means;
f. reciprocable means depending from said frame for perforating said fabric between the apices of said cusp-shaped indentations;
g. reciprocable means depending from said frame for bursting said fabric in the vicinity of said perforations;
h. means depending from said frame for tensioning said fabric;
i. means depending from said frame for urging said fabric outwardly of the longitudinal axis of said frame;
j. a spool journaled in said frame for accumulating a roll of said fabric after it has been burst in the vicinity of said perforations.

2. In a device according to claim 1:
a. said means depending from said frame for urging said fabric outwardly of the longitudinal axis of the frame including at least one roller contactable with said fabric and provided with at least one helical groove formed upon the circumferential periphery of the roller;
b. the fabric being pressed into the groove when the roller is brought into contact with the fabric 3. In a device according to claim 1:
a. said fabric being fed through a plurality of rollers disposed in vertically spaced relation;
b. the said rollers being contactable with said fabric;
c. the upper of said rollers being provided with a plurality of helical grooves formed upon its circumferential periphery;
d. the fabric being pressed into said grooves when said upper of said rollers is brought into contact with the fabric.

* * * * *